(12) United States Patent
Hearty et al.

(10) Patent No.: US 11,935,062 B2
(45) Date of Patent: Mar. 19, 2024

(54) GENERATING A FRAUD RISK SCORE FOR A THIRD PARTY PROVIDER TRANSACTION

(71) Applicant: MASTERCARD TECHNOLOGIES CANADA ULC, Vancouver (CA)

(72) Inventors: John Hearty, Vancouver (CA); Anton Laptiev, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 17/537,647

(22) Filed: Nov. 30, 2021

(65) Prior Publication Data

US 2022/0172213 A1 Jun. 2, 2022

Related U.S. Application Data

(60) Provisional application No. 63/119,760, filed on Dec. 1, 2020.

(51) Int. Cl.
*G06Q 20/40* (2012.01)
(52) U.S. Cl.
CPC .................. *G06Q 20/4016* (2013.01)
(58) Field of Classification Search
None
See application file for complete search history.

(56) References Cited

U.S. PATENT DOCUMENTS

| 7,660,705 B1 * | 2/2010 | Meek .................... G06F 18/295 703/2 |
| 7,908,645 B2 | 3/2011 | Varghese et al. |
| 8,875,267 B1 | 10/2014 | Kolman et al. |
| 10,147,065 B1 | 12/2018 | Yiftachel et al. |
| 10,963,943 B1 * | 3/2021 | Erickson ............ G06Q 20/4016 |
| 2010/0293094 A1 | 11/2010 | Kolkowitz et al. |
| 2019/0294595 A1 * | 9/2019 | Cheung ................. G06F 16/215 |
| 2020/0193443 A1 * | 6/2020 | Piel ........................ G06Q 20/02 |

(Continued)

FOREIGN PATENT DOCUMENTS

WO 2020180241 A1 9/2020

OTHER PUBLICATIONS

International Search Report and Written Opinion for Application No. PCT/CA2021/051706 dated Feb. 22, 2022 (11 pages).

(Continued)

*Primary Examiner* — Bruce I Ebersman
*Assistant Examiner* — Matthew Cobb
(74) *Attorney, Agent, or Firm* — Michael Best & Friedrich LLP

(57) ABSTRACT

A system for generating a fraud risk score for a third party provider (TPP) transaction. The system includes a server including an electronic processor. The electronic processor is configured to determine a frequency-recency-monetary value feature, a reputation feature, and a rule feature for a TPP transaction, using the frequency-recency-monetary value feature, the reputation feature, and the rule feature as input for a machine learning model, execute the machine learning model to generate a blended score, and, when the blended score is above a second predetermined threshold, determine that the TPP transaction is fraudulent.

17 Claims, 5 Drawing Sheets

(56) References Cited

U.S. PATENT DOCUMENTS

2020/0280578 A1  9/2020  Hearty et al.

OTHER PUBLICATIONS

Van Vlasselaer et al., "APATE: A novel approach for automated credit card transaction fraud detection using network-based extensions", Decision Support Systems, 2015, vol. 75, pp. 38-48.
Lucas et al., "Credit card fraud detection using machine learning: A survey", arXiv, 2020, pp. 1-31.

* cited by examiner

GENERATING A FRAUD RISK SCORE FOR A THIRD PARTY PROVIDER TRANSACTION

CROSS-REFERENCE TO RELATED APPLICATION

This application claims priority to and the benefit of U.S. Provisional Patent Application No. 63/119,760, filed on Dec. 1, 2020, the entire contents of which is incorporated herein by reference.

BACKGROUND

Banks are often required to allow third party providers (TPPs) to access user's accounts. A TPP may be a provider that offers account aggregation and payment services. For example, a TPP may be an incumbent bank, a fintech organization, or a merchant.

SUMMARY

Embodiments herein describe, among other things, a system, method, and computer-readable medium for generating a fraud risk score for a third party provider transaction. Generating a fraud risk score for a third party provider transaction is made difficult by limited data being available for performing fraud analysis. For example, data features may not be available (for example, because TPPs lack incentive to share them), features may not be consistent between TPPs or even within a single TPP (for example, when the TPP is a one-to-many aggregator providing e-store services to many merchants who do not send consistent data to the TPP), and features may not be effective for fraud detection (for example, when the TPP is a one-to-many aggregator providing e-store services to many merchants, the merchants may not send high quality data to the TPP). However, embodiments described herein can use a combination of features which are the most consistently available in spite of the above mentioned limitations, including features based on user behavior not currently analyzed in existing fraud detection systems, to generate a blended score to effectively perform fraud risk analysis. For example, rather than only using features based on what a user knows (for example, a password, security code, and the like), what a user has (for example, the personal computer or smartphone the user regularly uses), or who the user is (for example, when the user accesses an account, from where a user accesses an account, and the like), the embodiments described herein utilize features that describe a user's reputation across TPPs and changes in user behavior over time (for example, how often a user changes a zip code or a browser they use to make a TPP transaction, and the like).

The features analyzed by a machine learning model in the embodiments described herein allow a more accurate fraud risk analysis to be performed for a TPP transaction. These features allow for a more accurate fraud risk analysis because the features involve data that is generally available and consistent across entities (for example, TPPs or merchants for whom a TPP provides e-store services for). The analysis of the features by a machine learning model described herein allows for a more accurate fraud risk analysis because it combines multiple assessments into one. For example, in a system using only rule features and reputational features, many non-fraudulent TPP transactions may be deemed to be fraudulent. Because these non-fraudulent TPP transactions often do not involve anomalous amounts or anomalous frequencies, using frequency-recency-monetary value features (as well as rule features and reputation features) in the analysis of these TPP transactions would lead to them being correctly identified as non-fraudulent. In situations like this, an analysis based on all three types of features (the rule features, reputation features, and frequency-recency-monetary value features used by the embodiments described herein) is more effective than an analysis using only one or two types of features. Unlike the system and method described herein, existing systems and methods for determining a fraud risk score for TPP transactions do not use a combination of rule features, reputation features, and frequency-recency-monetary value features.

In some embodiments, a tree-based machine learning model is able to best exploit the conditional design of this feature set of three different types of features because it forms complex conditional functions based on inputs.

The embodiments described herein provide an extremely lightweight machine learning implementation (for example, a tree-based model) that allows the solution described herein to be run inline in many real-time payment processing contexts. The solution described herein is portable or compatible with many existing payment processing systems and outputs a result quickly. In some embodiments, the system and method described herein may perform a fraud risk analysis within 40 milliseconds of a user authorizing a TPP transaction. In evaluating a TPP transaction there is inevitably at least one more party involved (the TPP) than there is when evaluating first party transactions, so there is less processing time available for computing a fraud risk score for a TPP transaction compared to first party transactions. The implementation for generating a fraud risk score for a TPP transaction described herein is different from others because it performs a fraud risk analysis faster than other approaches, creating more opportunities for integration into existing payment processing systems.

One embodiment describes an example system for generating a fraud risk score for a third party provider (TPP) transaction. The system includes a server including an electronic processor. The electronic processor is configured to determine a frequency-recency-monetary value feature, a reputation feature, and a rule feature for a TPP transaction, using the frequency-recency-monetary value feature, the reputation feature, and the rule feature as input for a machine learning model, execute the machine learning model to generate a blended score, and, when the blended score is above a second predetermined threshold, determine that the TPP transaction is fraudulent.

Another embodiment describes an example method for generating a fraud risk score for a third party provider (TPP) transaction. The method includes determining a frequency-recency-monetary value feature, a reputation feature, and a rule feature for a TPP transaction, using the frequency-recency-monetary value feature, the reputation feature, and the rule feature as input for a machine learning model, executing the machine learning model to generate a blended score, and, when the blended score is above a second predetermined threshold, determining that the TPP transaction is fraudulent.

Yet another embodiment provides an example non-transitory computer-readable medium with computer-executable instructions stored thereon executed by an electronic processor to perform a method of generating a fraud risk score for a third party provider (TPP) transaction. The method includes determining a frequency-recency-monetary value feature, a reputation feature, and a rule feature for a TPP transaction, using the frequency-recency-monetary value feature, the reputation feature, and the rule feature as input for a machine learning model, executing the machine learning model to generate a blended score, and, when the blended score is above a second predetermined threshold, determining that the TPP transaction is fraudulent.

DETAILED DESCRIPTION OF THE EMBODIMENTS

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
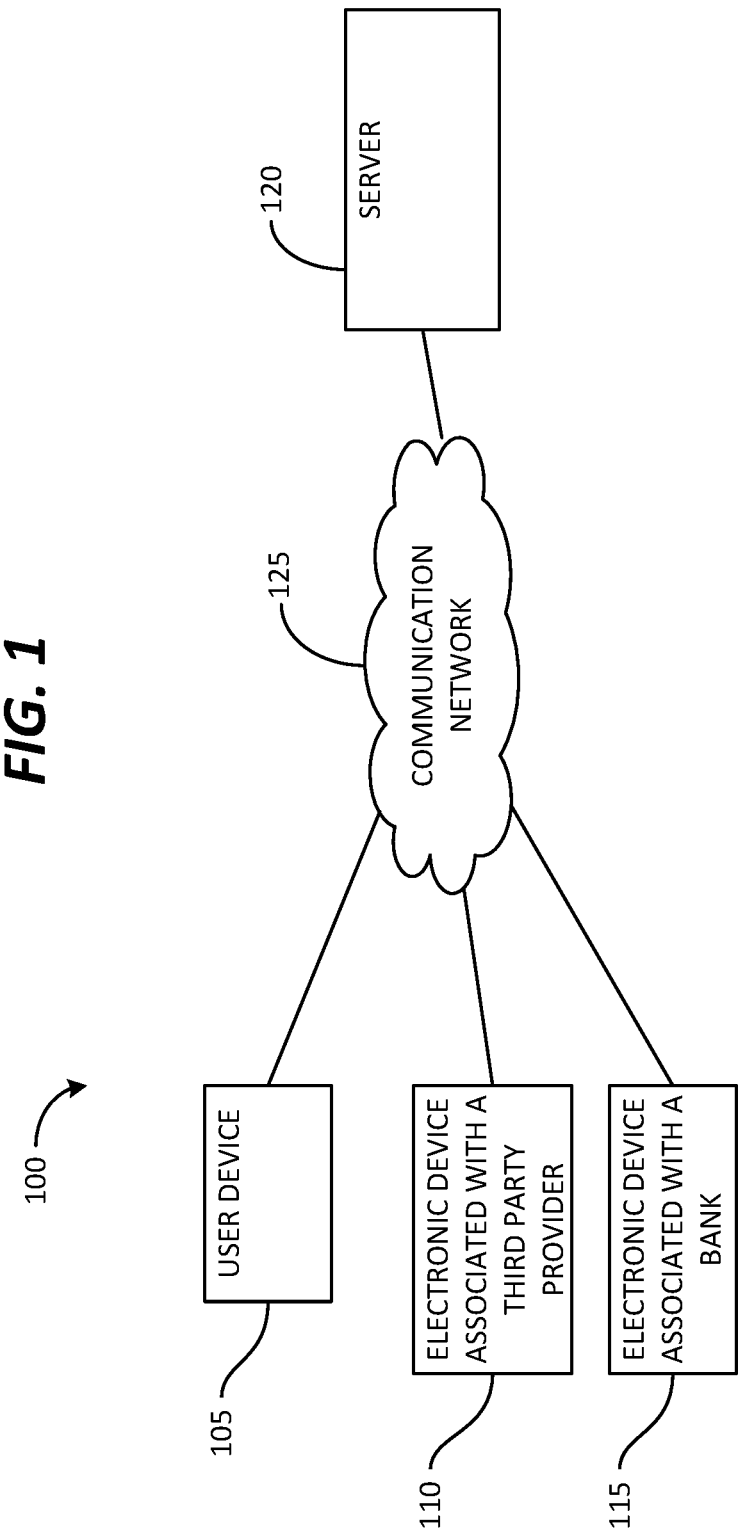
FIG. 1 is a block diagram of a system for generating a fraud risk score for a third party provider transaction in accordance with some embodiments.

FIG. 1 is a block diagram of a system 100 for generating a fraud risk score for a third party provider transaction. In the example shown, the system 100 includes a user device 105, an electronic device associated with a TPP 110, an electronic device associated with a bank 115, and a server 120. The user device 105, electronic device associated with a TPP 110, electronic device associated with a bank 115, and server 120 are communicatively coupled via a communication network 125. The communication network 125 is an electronic communications network including wireless and wired connections. The communication network 125 may be implemented using a variety of one or more networks including, but not limited to, a wide area network, for example, the Internet; a local area network, for example, a Wi-Fi network; or a near-field network, for example, a Bluetooth™ network.

It should be understood that the system 100 may include a different number of user devices and the number of user devices included in FIG. 1 are purely for illustrative purposes. It should also be understood that the system 100 may include a plurality of electronic devices associated with one of a plurality of TPPs. It should also be understood that the system 100 may include a plurality of electronic devices associated with one of a plurality of banks. It should also be understood that the system 100 may include a different number of servers than the number of servers illustrated in FIG. 1 and the functionality described herein as being performed by the server 120 may be performed by a plurality of servers.

Figure 2:
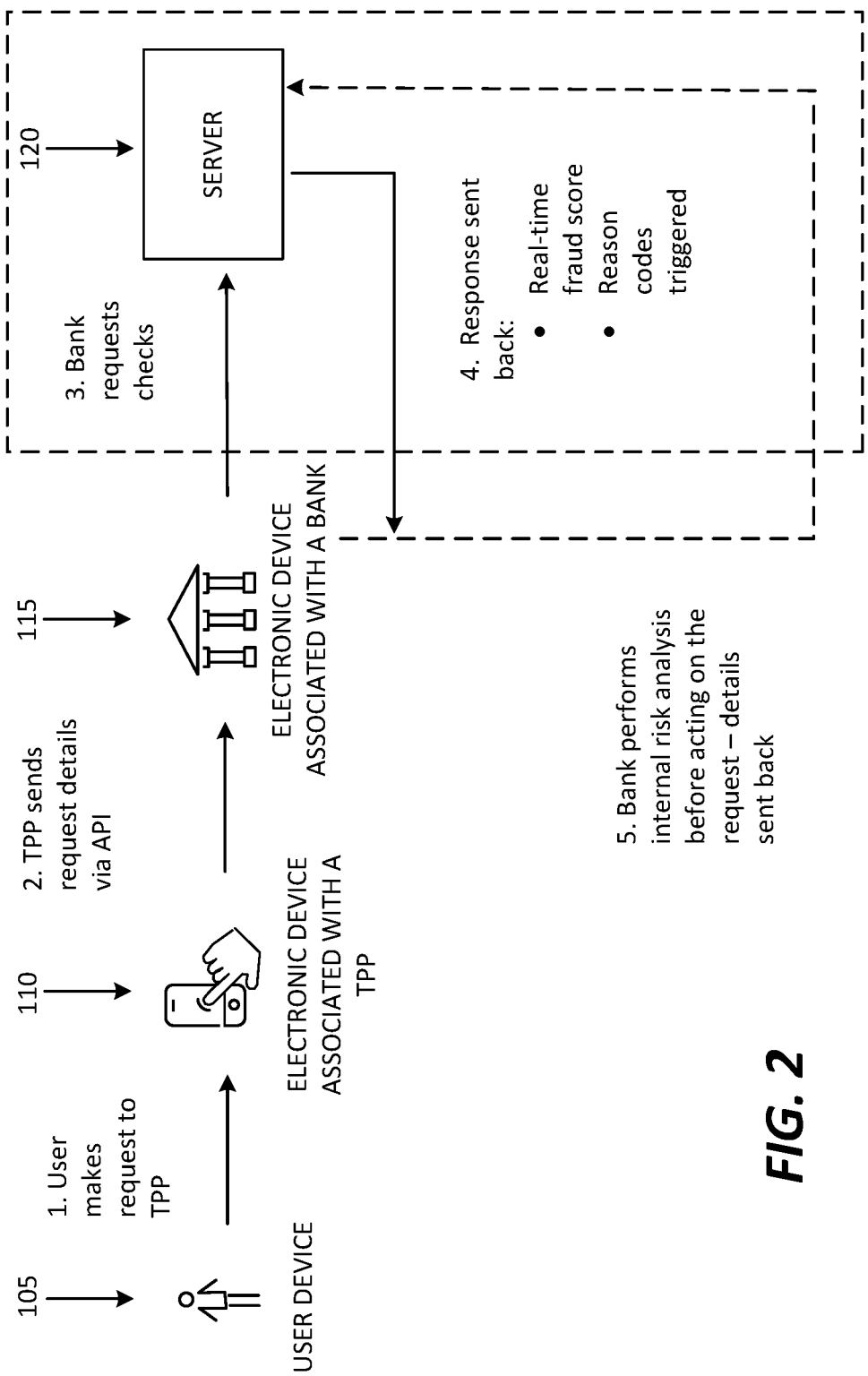
FIG. 2 is an example flow chart illustrating communication between components of the system of FIG. 1 in accordance with some embodiments.

FIG. 2 is an example flow chart illustrating how the user device 105, electronic device associated with a TPP 110, electronic device associated with a bank 115, and server 120 included in the system 100 of FIG. 1 communicate with one another. In the example illustrated in FIG. 2, a user, via the user device 105, authorizes a TPP to access a bank account associated with the user. For example, the user may be allowing the TPP access to their bank account in order to pay for a purchase that the user made online. When the electronic device associated with the TPP 110 receives authorization from the user to access the user's bank account, the electronic device associated with the TPP 110 sends a request to access the user's bank account to the electronic device associated with a bank 115. The electronic device associated with the TPP 110 may send the request to the electronic device associated with a bank 115, via an API. Before allowing the electronic device associated with the TPP 110 access to the user's bank account, the electronic device associated with a bank 115 sends a request to the server 120 to generate a fraud risk score for the TPP. The server 120 generates and sends to the electronic device associated with a bank 115 a fraud risk score for the TPP and, in some embodiments, one or more reasons for the fraud risk score. The electronic device associated with a bank 115 uses the fraud risk score to determine whether or not to allow the TPP to access the user's bank account.

Figure 3:
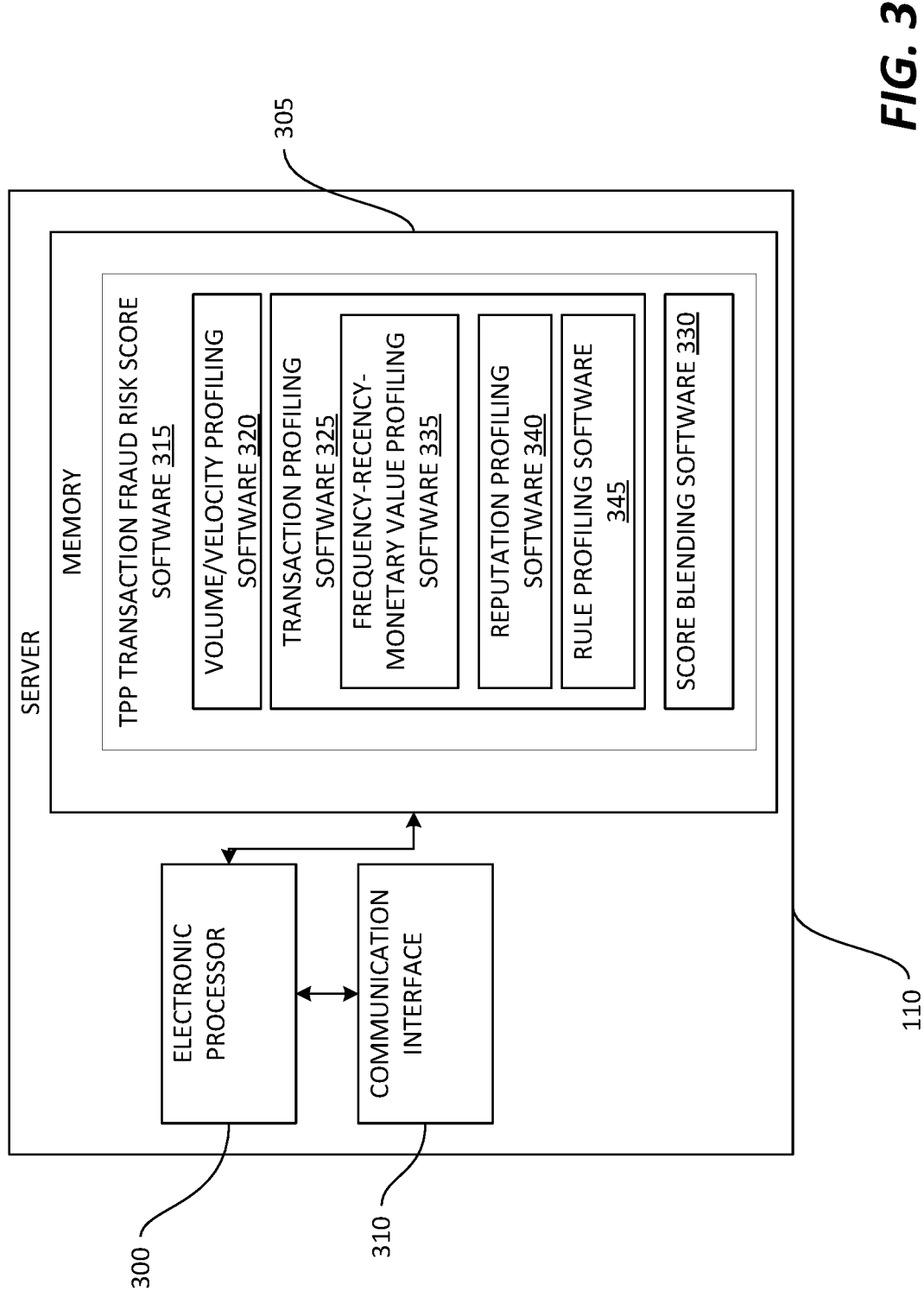
FIG. 3 is a block diagram of a server of the system of FIG. 1 in accordance with some embodiments.

FIG. 3 is an example block diagram of an example of the server 120. As illustrated in FIG. 3, the server 120 includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication network(s) 125 and, optionally, one or more additional communication networks or connections. The communication interface 310 allows the server 120 to communicate with the electronic device associated with a bank 115 over the communication network(s) 125.

In the embodiment illustrated in FIG. 3, the memory 305 included in the server 120 includes TPP transaction fraud risk score software 315. In some embodiments, when the electronic processor 300 executes the TPP transaction fraud risk score software 315, the electronic processor 300 generates a fraud risk score for a transaction associated with a TPP. In some embodiments, the TPP transaction fraud risk score software 315 includes volume profiling software 320, transaction profiling software 325, and score blending software 330, each of which will be described in further detail below with regard to FIG. 4. The transaction profiling software 325 includes frequency-recency-monetary value profiling software 335, reputation profiling software 340, and rule profiling software 345, each of which will be described in further detail below with regard to FIG. 4. It should be understood that the functionality described herein as being performed by the TPP transaction fraud risk score software 315 may be distributed among multiple applications or software components. Additionally, the TPP transaction fraud risk score software 315 may perform functionality other than that which is described herein.

Figure 4:
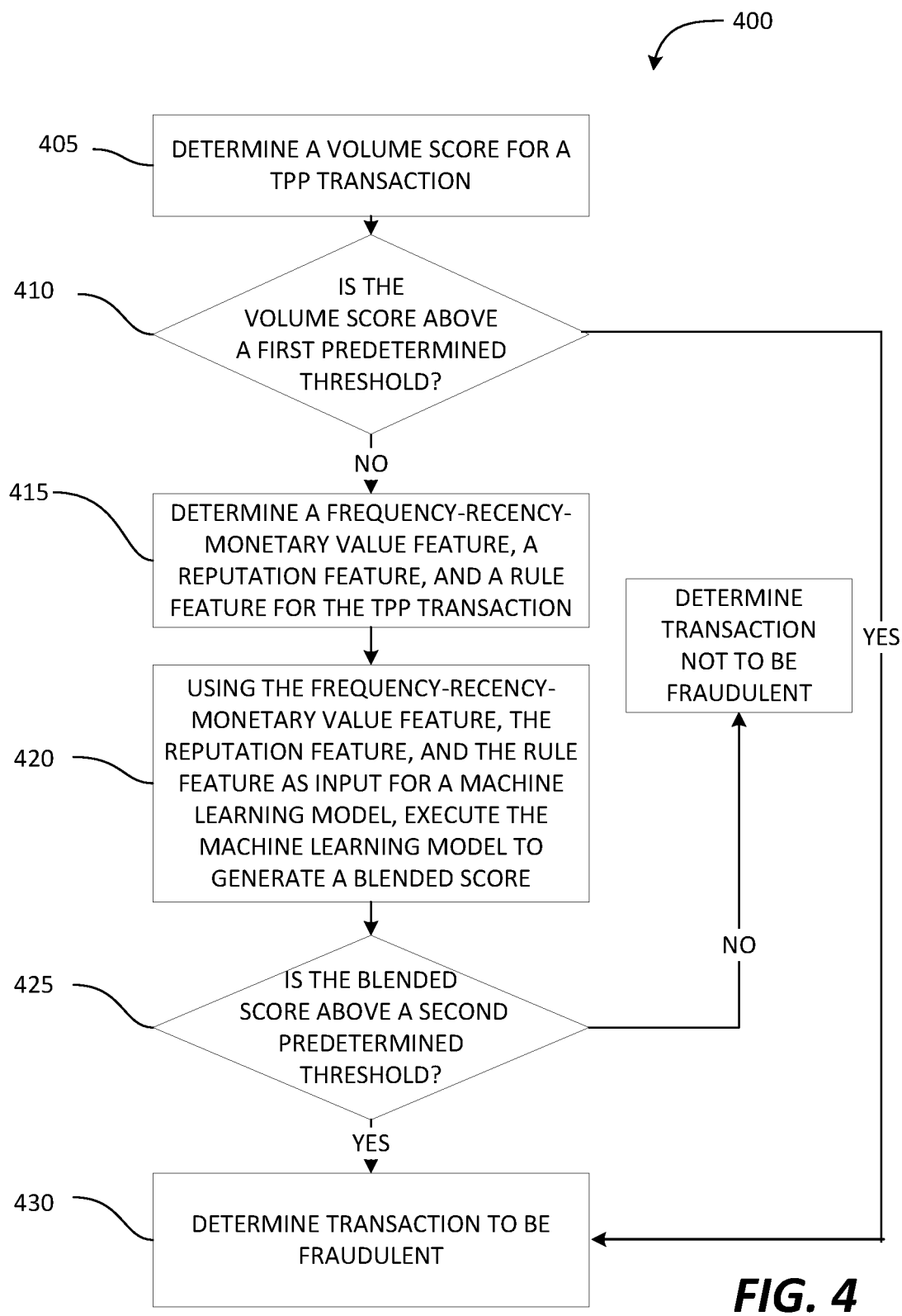
FIG. 4 is a flow chart of a method for generating a fraud risk score for a third party provider transaction in accordance with some embodiments.

FIG. 4 is a flow chart illustrating a method 400 for generating a fraud risk score for a third party provider transaction. The method begins at step 405 when the electronic processor 300 executes the volume profiling software 320 to determine a volume score for a TPP transaction. Determining a volume score includes checking whether automated attacks are being performed against or via the TPP associated with the TPP transaction. For example, the electronic processor 300 may determine the volume score by determining the number of TPP transactions received during a predetermined time frame that are associated with a common useragent string, IP address, country, persistent device identification token, geo location, or the like.

At step 410, the electronic processor 300 determines whether the volume score is above a first predetermined threshold. When the volume score is above the first predetermined threshold, the electronic processor 300 determines the TPP transaction is fraudulent and associated with an automated attack (for example, credential testing). In some embodiments, when the electronic processor 300 detects an automated attack, the current TPP transaction and other transactions attributed to that attack are labeled as fraudulent and stored in a TPP fraud profiling data base.

When the volume score is not above the first predetermined threshold, the method 400 continues to step 415, where the electronic processor 300 executes the frequency-recency-monetary value profiling software 335, reputation profiling software 340, and rule profiling software 345 to determine frequency-recency-monetary value features, reputation features, and rule features. In some embodiments, the electronic processor 300 executes the frequency-recency-monetary value profiling software 335, reputation profiling software 340, and rule profiling software 345 in parallel to generate the frequency-recency-monetary value features, reputation features, and rule features approximately simultaneously. In some embodiments, historical rates associated with a user or an attribute of a TPP transaction are precalculated by the electronic processor 300 before the current TPP transaction is received.

When the electronic processor 300 generates the frequency-recency-monetary value features for the TPP transaction, the electronic processor 300 compares the current TPP transaction to a predetermined number of historical transactions by the same payer account, payee account, or both, persistent device identification token, IP address, user-agent string, TPP, merchant, and the like as the current TPP transaction. In other words, frequency-recency-monetary value features are time aware features based on a user's normal or pre-existing behavior compared to the TPP transaction that the user has authorized. For example, frequency-recency-monetary value features indicate whether the TPP transaction is in line with the normal behavior of the user with regards to how frequently the user transacts in a given time period, how much the user spends in a given time period (for example, a week), the time since the user last spent money, a combination of the foregoing, or the like. The following table includes examples of frequency-recency-monetary value features generated by the electronic processor 300 to determine whether the TPP transaction is fraudulent.

| Frequency-Recency-Monetary Value Features | Description |
| --- | --- |
| purchase_frequency | This feature includes a numeric value indicating the rate at which purchases associated with the user authorizing the current TPP transaction were made in the 18-week period preceding the current TPP transaction. The numeric value may be expressed in days. For example, a user that purchases every 2.4 days would be represented by the numeric value 2.4. |
| accountemaildomain_change_frequency | This feature includes a numeric value indicating how frequently the domain of the email address associated with the user authorizing the current TPP transaction changes. Changing email address domains is a behavior commonly observed during the takeover of a user account by a fraudulent user. |
| email_change_frequency | This feature includes a numeric value indicating how frequently the email string |

| Frequency-Recency-Monetary Value Features | Description |
| --- | --- |
| | (alias and/or domain) associated with the user authorizing the current TPP transaction changes. |
| ipcarrier_change_frequency | This feature includes a numeric value indicating how frequently the IP provider associated with the user authorizing the current TPP transaction changes. |
| zipcode_change_frequency | This feature includes a numeric value indicating how frequently the zip code used by the user authorizing the current TPP transaction to make a purchase changes. This feature does not retain or store the zip code but measures frequency of change in zip code. |
| browserplatform_change_frequency | This feature includes a numeric value indicating how frequently the internet browser used by the user authorizing the current TPP transaction to make a purchase changes. |
| ip_change_frequency | This feature includes a numeric value indicating how frequently the IP address used by the user authorizing the current TPP transaction to make a purchase changes. It may be normal for IP addresses to change more frequently than other attributes and, therefore, this feature may be weighted at a lower value by the machine learning model described below. |

In some embodiments, the electronic processor 300 generates the reputation features based on attributes of the current TPP transaction such as payer account, payee account, or both, persistent device identification token, IP address, useragent string, TPP, merchant. In some embodiments, reputation features are related to data regarding the user authorizing the TPP transaction collected across multiple TPPs with electronic devices included in the system 100. For example, the electronic processor 300 may generate the reputation features based on one or more historical fraud rates, each associated with an attribute of the current TPP transaction; one or more transaction failure rates, each associated with an attribute of the current TPP transaction; one or more percentages of transactions triggering specific high-risk logic rules, each percentage associated with an attribute of the current TPP transaction, a combination of the foregoing, and the like. The following table includes examples of reputation features generated by the electronic processor 300 to determine whether the TPP transaction is fraudulent.

| Reputation Features | Description |
| --- | --- |
| is_suspicious_ip | This feature indicates whether the IP Address associated with a TPP transaction is included in a periodically updated list of fraud-associated IP Addresses. |
| is_suspicious_did | This feature indicates whether the device identifier (DID) associated with a TPP transaction is included in a periodically updated list of fraud-associated DIDs. |
| is_suspicious_accountid | This feature indicates whether the account identifier associated with a TPP transaction is included in a periodically updated list of fraud-associated Account IDs. |
| has_history | This feature indicates whether there was a successful purchase associated with an attribute of the TPP transaction (for example, the IP address, device identifier, or the like) within the 18-week period preceding the current TPP transaction. |

The electronic processor 300 determines the rule features for the TPP transaction based on whether TPP transaction triggers certain rules. For example, a rule may be triggered when the transaction involves the user making a payment to their own account, a rule may be triggered when the transaction involves the user making a payment using a VPN, a rule may be triggered when the transaction involves the user typing an unrealistic number of words per minute, and the like. In some embodiments, each rule may be associated with a numerical scoring value. The scoring values may be determined through manual analysis, machine learning algorithms, or the like. The following table includes examples of rule features generated by the electronic processor 300 to determine whether the TPP transaction is fraudulent.

| Rule Features | Description |
| --- | --- |
| has_geo_anonymous | This feature indicates whether derived geographical attributes (commonly derived using a lookup from an IP address) are available or obscured. IP obscurement is abnormal behavior for a benign (non-fraudulent) user. |
| has_cloud_hosting_ip | This feature indicates whether the TPP transaction is routed through a cloud/web hosting provider. Routing a TPP transaction through a cloud/web hosting provider is abnormal behavior for a benign (non-fraudulent) user. |
| has_tor_exit_node | This feature indicates whether the TPP transaction is being routed through the onion router (TOR) network protocol. Routing a TPP transaction through TOR network protocol is common behavior for users engaging in purchase fraud. |

At step 420, the electronic processor 300 uses the frequency-recency-monetary value features, the reputation features, and the rule features as input for a machine learning model, to execute the machine learning model (included in, for example, the score blending software 330) to generate a blended score. It is not always clear what is implied by a single feature but, by considering the features in relation to one another, the machine learning model can determine whether the features indicate whether a TPP transaction is fraudulent or not.

In some embodiments, the electronic processor 300 may preprocess the features before the features are input to the machine learning model.

In some embodiments, preprocessing the features include data cleaning and value transformation. Preprocessing may be performed online (for example, by the electronic processor 300) or offline. In some embodiments, the machine learning model described below is trained using preprocesed features. During the execution of the method 400, it is important that features are preprocessed in the same manner that they were when the machine learning model was trained.

In some embodiments, data cleaning is performed by the electronic processor 300 as a series of operations including data validation, data cleaning, and data verification.

In some embodiments, data validation includes checking for missing data values, mistyped data values, out-of-range or impossible data values, or outlying data values. In some embodiments, the electronic processor 300 may validate data at the level of individual attributes (for example, numerically), structurally (for example, by checking a record containing multiple features to confirm it the record does not contain too many or few values), or both. In some embodiments, data may be validated by an analyst, who may, for example, intentionally perform a specific action (for example, issue a purchase) multiple times and then inspect the generated data for accuracy (in other words, does it describe the action) and variance (in other words, does it remain consistent between trials).

In some embodiments, the electronic processor 300 performs data cleaning by performing prescribed actions, generic cleaning activies, and specific cleaning actions based on the results of validation. Generic cleaning activities may include value formatting feature values to conform to the input specifications of the machine learning model, artifact removal (for example, removing formatting characters or artifacts sent by the user device 105), data type conversions (for example, converting vector or scalar data to appropriate data types), and rescaling or normalization of numerical values to lie within specified ranges or distributions (for example, values might be rescaled to lie between 0 and 1).

Regarding specific cleaning actions based on the results of validation, in principle, for every data validation outcome, the electronic processor 300 performs an associated cleaning action. For example, missing values discovered during data validation may be replaced by dummy-coded values or values inferred using a population-level technique during data cleaning.

In some embodiments, rather than both being performed by the electronic processor 300, data validation and data cleaning may be executed by separate electronic processors. For example, in a cloud-based deployment, data validation may be performed by a streaming ingestion service, which outputs data to a separate preprocessing module for data cleaning. This may be necessary to ensure scalability (for example, the ability to process a large number of records within a certain time limit). For example, data cleaning may require access to lookup data (for example, a table of current statistical values associated with an attribute). In this situation having the streaming service call an external table for a number of records could possibly be inefficient, leading to delayed output, dropped records, or both. It is typically better to avoid having a streaming service make such time-consuming or complex changes and instead to have the streaming service tag or identify the data quality issue using a string, numeric or binary error code, or the like and then have the preprocessing module perform necessary adjustments to address the data quality issue.

Data verification may be performed by a human analyst, or automatically by the electronic processor 300. Data verification includes assessing the results of the data cleaning and the data cleaning process itself in order to determine the validity of the output and ensure successful preprocessing. Data verification performed by the electronic processor 300 may include monitoring and outputting alerts to notify a human analyst of risk factors. Risk factors may include an increase in outlying values, an increase in missing values, an increase in other data quality issues identified during verification, an increase in error codes returned during data verification, data cleaning, or both, and the like.

In some embodiments, the electronic processor 300 may perform value transformation by converting non-numerical features into a numerical representation. For example, the electronic processor 300 may encode features associated with a categorical value. In another example, if a feature indicated that a user usually makes a transaction every 10 days but made their most recent transaction only 6 days after making their most previous transaction, the electronic processor 300 may convert the feature to the numerical value 4 indicating the difference between the user's usual time lapse between making transactions (10) and the time lapse between the user's two most recent transactions (6).

In some embodiments, the machine learning model is a linear regression model or a tree-based model. In some embodiments, the linear regression model or tree-based model produces the blended score as a value between 0 and 1. In some embodiments, rather than a machine learning model, mathematical functions, such as probability averaging, are utilized by the score blending software 330 to generate a blended score. In some embodiments, unsupervised learning algorithms such as robust principal component analysis (RPCA) algorithm, a k-nearest neighbors algorithm, or a local outlier factor (LOF) algorithm, are utilized by the score blending software 330 to identify anomalies. In some embodiments, parallel ensemble learning methods, such as a random forest, are utilized by the score blending software 330 to generate a blended score and reduce error through techniques such as bootstrap aggregation (or bagging).

Figure 5:
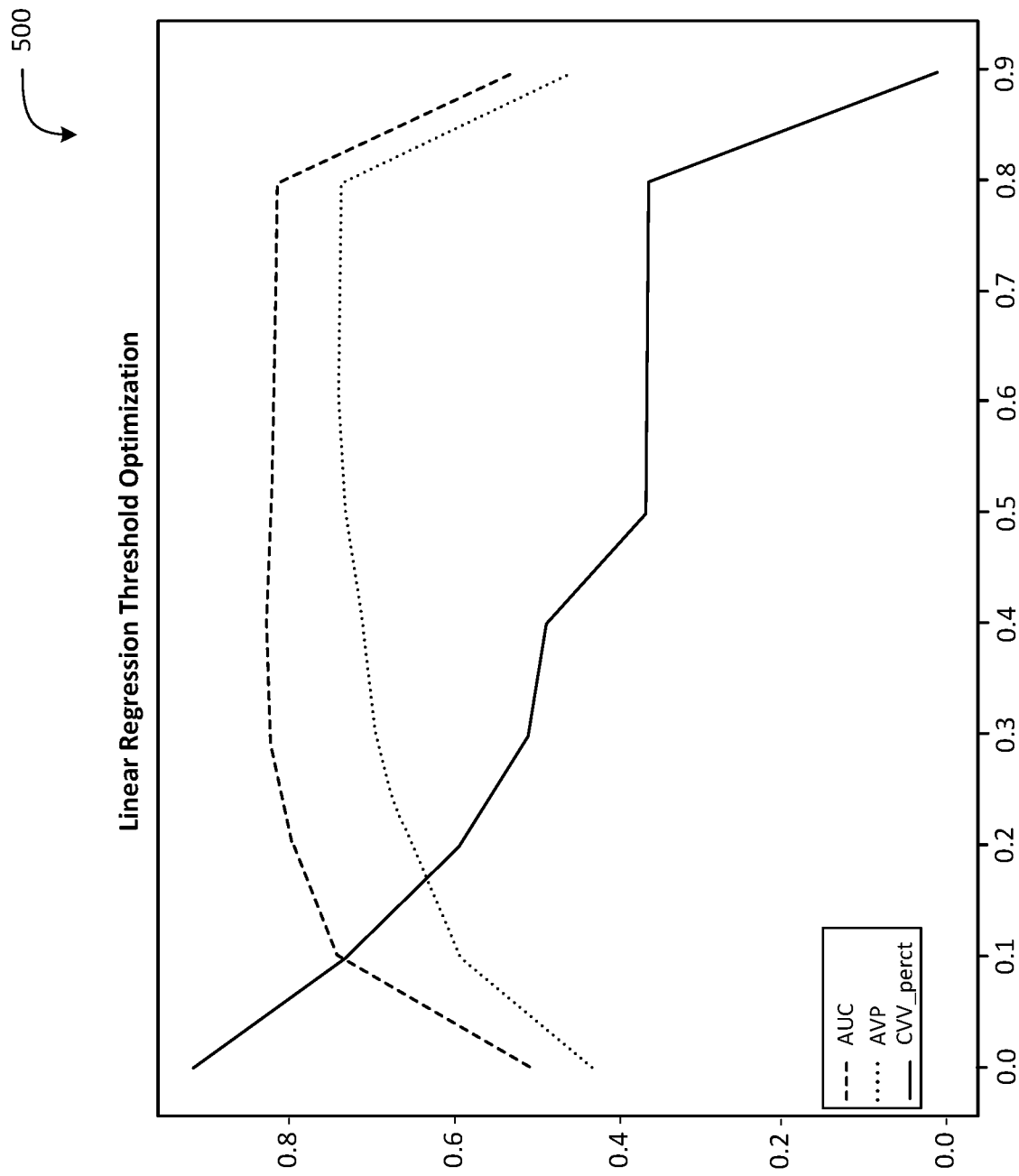
FIG. 5 illustrates an example graph that may be used by a data scientist to determine an appropriate second predetermined threshold to use in the execution of the method of FIG. 4.

At step 425, the electronic processor 300 determines whether the blended score is above a second predetermined threshold. When the blended score is above the second predetermined threshold, at step 430, the electronic processor 300 determines that the TPP transaction is fraudulent and associated with an automated attack. In some embodiments, when the electronic processor 300 detects a fraudulent transaction, the current TPP transaction is labeled as fraudulent and stored in a TPP fraud profiling data base. In some embodiments, determining the second predetermined threshold requires balancing the tradeoffs between precision, recall, and other performance measurements. In some embodiments, the second predetermined threshold may be varied, and performance measurements may be captured during the training of the machine learning model to understand the effect of different second predetermined thresholds on the performance of the machine learning model. For example, the graph 500 illustrated in FIG. 5 plots the second predetermined threshold value on the horizontal axis against the values of three performance measurements on the vertical axis. The three performance measurements plotted in the graph 500 are where the performance measures are the area under the curve (AUC), the average precision (AVP), and the coefficient of variation expressed as a percent (CVV_perct). A graph such as the graph 500 may be used by a data scientist to determine an appropriate second predetermined threshold to use in the execution of the method 400.

In some embodiments, the electronic processor 300 is configured to adjust the second predetermined threshold based on changes in the distribution of values for a feature. Changes may be determined based on movement specific percentiles. For example, a change may be detected when the 90$^{th}$ percentile value for a feature moves upwards by 10 percent. A change in the distribution of values for a feature may indicate a change in purchasing behavior across users interacting with a TPP. For example, at certain points of the year (such as Christmas, Black Friday, and the like) it may be normal for users to spend significantly more than usual. To prevent determinations that normal transactions are fraudulent during an anomalous event (for example, Christmas), the electronic processor 300 adjusts the second predetermined threshold.

In some embodiments, to adjust the second predetermined threshold, the electronic processor 300 sets the second predetermined threshold to a predetermined value and then adjusts the second predetermined threshold by increasing or decreasing the second predetermined threshold based on a desired rate at which TPP transactions are identified as fraudulent. For example, the electronic processor 300 may set the second predetermined threshold to a predetermined value of 0.4 and the desired rate may be 15 percent. If, when the second predetermined threshold is 0.4, the rate at which TPP transactions are identified as fraudulent is 20 percent, the electronic processor 300 may adjust the second predetermined threshold to 0.5. If, when the second predetermined threshold is 0.5, the rate at which TPP transactions are identified as fraudulent is 10 percent, the electronic processor may adjust the second predetermined threshold to 0.45. The electronic processor 300 may continue to adjust the second predetermined threshold until the rate at which TPP transactions are identified as fraudulent is at or near the desired rate (for example, near the desired rate may be the desired rate plus or minus two percent). In some embodiments, the desired rate is the average rate at which TPP transactions are identified as fraudulent when no anomalous event is occurring.

In some embodiments, when the electronic processor 300 determines that the anomalous event is over, the electronic processor 300 reverts the second predetermined threshold to the value it was before the anomalous event occurs. For example, the electronic processor may determine that the anomalous event is over when spending rates across users interacting with a TPP return to levels they were at before the anomalous event occurred. For example, spending rates may return to normal levels the week following Christmas, having been unusually high during the three weeks prior to Christmas.

In some embodiments, when the electronic processor 300 is identifying fraudulent TTP transactions at a rate outside of a desired range of rates (for example, within 5 percent of the ground truth rate), the electronic processor 300 adjusts the second predetermined threshold by increasing or decreasing the second predetermined threshold. For example, when the electronic processor is determining 35 percent of TPP transactions associated with a TPP are fraudulent and the desired range of rates is 10 percent to 20 percent, the electronic processor 300 may adjust the value of the second predetermined threshold until the desired rate of 10 percent to 20 percent is achieved. In some embodiments, the electronic processor 300 may also monitor changes in the distribution of values or blended scores output by the machine learning model. In some embodiments, the electronic processor 300 also monitors changes in the percent of missing or invalid values identified during data validation as apart of preprocessing.

In some embodiments, the electronic processor 300 sends one or more of the volume score, frequency-recency-monetary value features, reputation features, rule features, and blended score to the electronic device associated with the bank that requested the server 120 to analyze the TPP transaction (for example, the electronic device associated with the bank 115). In some embodiments, the electronic processor 300 sends an indication of whether or not it determined the TPP transaction to be fraudulent to the electronic device associated with the bank 115.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for generating a fraud risk score for a third party provider (TPP) transaction, the system comprising:
   an electronic device configured to manage an online resource; and
   a server including an electronic processor, the electronic processor configured to
      set an adjustable predetermined threshold to a predetermined value;
      receive, from the electronic device, a request to generate a fraud risk score for a TPP transaction;
      determine a frequency-recency-monetary value feature, a reputation feature, and a rule feature for the TPP transaction;
      when there is a first change in a distribution of values for the frequency-recency-monetary value feature across users interacting with a TPP, determine that an anomalous event is occurring and adjust the adjustable predetermined threshold based on the change in the distribution of values for a frequency-recency-monetary value feature;
      when there is a second change in the distribution of values for the frequency-recency-monetary value feature across users interacting with the TPP, determine the anomalous event is over and revert the adjustable predetermined threshold to the predetermined value;
      using the frequency-recency-monetary value feature, the reputation feature, and the rule feature as input for a machine learning model, execute the machine learning model to generate a blended fraud risk score;
      when the blended fraud risk score is above the adjustable predetermined threshold, determine that the TPP transaction is fraudulent; and
      send an indication of whether the TPP transaction is fraudulent to the electronic device, wherein the electronic device allows or denies access to the online resource based on the indication of whether the TPP transaction is fraudulent.

2. The system according to claim 1, wherein the electronic processor is further configured to:
   determine a volume score for the TPP transaction; and when the volume score is above a first predetermined threshold, determine that the TPP transaction is fraudulent.

3. The system according to claim 1, wherein the machine learning model is a linear regression model or a tree-based model.

4. The system according to claim 1, wherein the electronic processor is further configured to:
- determine a rate at which TPP transactions are being determined fraudulent;
- compare the rate to a desired rate;
- when the rate is a predetermined amount greater than the desired rate, increase the adjustable predetermined threshold; and
- when the rate is a predetermined amount less than the desired rate, decrease the adjustable predetermined threshold.

5. The system according to claim 1, wherein the frequency-recency-monetary value feature is a time aware feature based on a user's pre-existing behavior compared to the TPP transaction that the user has authorized.

6. The system according to claim 1, wherein the reputation feature is related to data collected across multiple TPPs regarding a user authorizing the TPP transaction.

7. The system according to claim 1, wherein the electronic processor is further configured to:
- preprocess the frequency-recency-monetary value feature, the reputation feature, and the rule feature by performing value transformation, and data cleaning, or both.

8. A method for generating a fraud risk score for a third party provider (TPP) transaction, the method comprising:
- setting an adjustable predetermined threshold to a predetermined value;
- receiving from an electronic device configured to manage an online resource, a request to generate a fraud risk score for a TPP transaction;
- determining a frequency-recency-monetary value feature, a reputation feature, and a rule feature for the TPP transaction;
- when there is a first change in a distribution of values for the frequency-recency-monetary value feature across users interacting with a TPP, determining that an anomalous event is occurring and adjusting the adjustable predetermined threshold based on the change in the distribution of values for a frequency-recency-monetary value feature;
- when there is a second change in the distribution of values for the frequency-recency-monetary value feature across users interacting with the TPP, determining the anomalous event is over and reverting the adjustable predetermined threshold to the predetermined value;
- using the frequency-recency-monetary value feature, the reputation feature, and the rule feature as input for a machine learning model, executing the machine learning model to generate a blended fraud risk score;
- when the blended fraud risk score is above the adjustable predetermined threshold, determining that the TPP transaction is fraudulent; and
- sending an indication of whether the TPP transaction is fraudulent to the electronic device, wherein the electronic device allows or denies access to the online resource based on the indication of whether the TPP transaction is fraudulent.

9. The method according to claim 8, the method further comprising:
- determining a volume score for the TPP transaction; and
- when the volume score is above a first predetermined threshold, determining that the TPP transaction is fraudulent.

10. The method according to claim 8, the method further comprising:
- determining a rate at which TPP transactions are being determined fraudulent;
- comparing the rate to a desired rate;
- when the rate is a predetermined amount greater than the desired rate, increasing the adjustable predetermined threshold; and
- when the rate is a predetermined amount less than the desired rate, decreasing the adjustable predetermined threshold.

11. The method according to claim 8, wherein the frequency-recency-monetary value feature is a time aware feature based on a user's pre-existing behavior compared to the TPP transaction that the user has authorized.

12. The method according to claim 8, wherein the reputation feature is related to data collected across multiple TPPs regarding a user authorizing the TPP transaction.

13. A non-transitory computer-readable medium with computer-executable instructions stored thereon executed by an electronic processor to perform a method of generating a fraud risk score for a third party provider (TPP) transaction, comprising:
- setting an adjustable predetermined threshold to a predetermined value;
- receiving from an electronic device configured to manage an online resource, a request to generate a fraud risk score for a TPP transaction;
- determining a frequency-recency-monetary value feature, a reputation feature, and a rule feature for the TPP transaction;
- when there is a first change in a distribution of values for the frequency-recency-monetary value feature across users interacting with a TPP, determining that an anomalous event is occurring and adjusting the adjustable predetermined threshold based on the change in the distribution of values for a frequency-recency-monetary value feature;
- when there is a second change in the distribution of values for the frequency-recency-monetary value feature across users interacting with the TPP, determining the anomalous event is over and reverting the adjustable predetermined threshold to the predetermined value;
- using the frequency-recency-monetary value feature, the reputation feature, and the rule feature as input for a machine learning model, executing the machine learning model to generate a blended fraud risk score;
- when the blended fraud risk score is above the adjustable predetermined threshold, determining that the TPP transaction is fraudulent; and
- sending an indication of whether the TPP transaction is fraudulent to the electronic device, wherein the electronic device allows or denies access to the online resource based on the indication of whether the TPP transaction is fraudulent.

14. The non-transitory computer-readable medium according to claim 13, the method further comprising:
- determining a volume score for the TPP transaction; and
- when the volume score is above a first predetermined threshold, determining that the TPP transaction is fraudulent.

15. The non-transitory computer-readable medium according to claim 13, the method further comprising:

determining a rate at which TPP transactions are being determined fraudulent;

comparing the rate to a desired rate;

when the rate is a predetermined amount greater than the desired rate, increasing the adjustable predetermined threshold; and when the rate is a predetermined amount less than the desired rate, decreasing the adjustable predetermined threshold.

16. The non-transitory computer-readable medium according to claim 13, wherein the frequency-recency-monetary value feature is a time aware feature based on a user's pre-existing behavior compared to the TPP transaction that the user has authorized.

17. The non-transitory computer-readable medium according to claim 13, wherein the reputation feature is related to data collected across multiple TPPs regarding a user authorizing the TPP transaction.

* * * * *